United States Patent [19]

Biasse et al.

[11] Patent Number: 5,656,181
[45] Date of Patent: Aug. 12, 1997

[54] PROCESS FOR PRODUCING CIRCULAR, BURIED WAVEGUIDES AND THE ASSOCIATED DEVICES

[75] Inventors: Béatrice Biasse, Uriage; Florent Pigeon, St. Ehenice, both of France

[73] Assignee: Commissariat a l'Energie Atomique, Paris, France

[21] Appl. No.: 497,754

[22] Filed: Jul. 3, 1995

[30] Foreign Application Priority Data

Jul. 6, 1994 [FR] France .................................. 94 08343

[51] Int. Cl.⁶ .................. B44C 1/22; C03C 15/00
[52] U.S. Cl. .................. 216/24; 216/34; 216/67; 216/80
[58] Field of Search .................. 216/24, 33, 39, 216/34, 38, 41, 67, 80, 97, 52, 53, 88, 90

[56] References Cited

U.S. PATENT DOCUMENTS 5,032,220   7/1991   Yamamoto et al. ................. 216/24
5,480,764   1/1996   Gal et al. ........................... 216/24

*Primary Examiner*—William Powell
*Attorney, Agent, or Firm*—Pearne, Gordon, McCoy & Granger LLP

[57] ABSTRACT

The process for the preparation of a waveguide buried in a glass substrate according to the invention consists of the following stages:

- a stage of producing a waveguide (28, 38) by ion exchange on the surface of each of two glass substrates (22, 32),
- a stage of aligning both substrates, so that the surfaces in which the waveguides have been produced face one another,
- a direct wafer bonding stage of the two substrates.

13 Claims, 7 Drawing Sheets

PROCESS FOR PRODUCING CIRCULAR, BURIED WAVEGUIDES AND THE ASSOCIATED DEVICES

TECHNICAL FIELD OF THE INVENTION

The present invention relates to the production of integrated optical circuits on glass.

For a long time, integrated optics on glass and silicon has competed with fibre optic component technology. At present, it is known to produce passive components (couplers), mechanical or chemical sensors, as well as active components (amplifiers) with the aid of these two technologies. Unlike in the case of fibre optics components, components produced in integrated optics offer the potential of being manufacturable in large quantities and at low prices.

Moreover, integrated optics circuits on glass are considered as very good candidates for applications connected with the processing of optical signals in the field of communications, sensors, couplers or for producing active circuits such as lasers and amplifiers.

The procedure consisting of using waveguides on glass for producing integrated optics components is of interest for several reasons. It uses a low temperature process requiring only a single masking level, which is relatively simple and inexpensive. The guides also have low losses, e.g. in the near infrared, particularly when they are buried, because there is then a reduction of the losses by diffusion by surface irregularities. By adapting the manufacturing conditions, the index profiles and the desired characteristics can be obtained. Glass is also of interest due to its limited sensitivity to optical damage, for its index compatibility with optical fibres and for the possibility it offers for obtaining birefringent components. The potential production cost is also relatively low.

PRIOR ART

The literature describes various processes for producing circuits in integrated optics on glass.

The ion exchange procedure is far and away the most widely used due to its ease of implementation. It is more specifically described in the work by S. Najafi entitled "Introduction to glass integrated optics", Artech House, London, 1992. An example using this method will now be briefly described in conjunction with FIGS. 1a, 1b and 2 and essentially consists of two stages. In a first stage, deposition takes place on a glass substrate 2 (FIG. 1a) of an aluminium mask 4. The assembly is then immersed in a molten salt bath e.g. containing $Ag^+$ or $K^+$ cations. At the locations where the mask is open, there is an exchange between the $Na^+$ cations of the glass and the $Ag^+$ cations of the salt bath, which produces a rise in the refractive index in the diffusion zone and leads to the formation of a semi-elliptical waveguide 6 (cf. FIG. 1a), whose lateral dimension is dependent on the width of the window 7 made in the aluminium mask.

The guide is buried in a second stage. For this operation an electric field $\vec{E}$ is applied between the faces of the substrate 2, which leads to the migration of the doped zone with $Ag^+$ ions. As the ions migrate faster in the direction of the electric field, the index profile becomes circular, as is illustrated in FIG. 1b. The profile obtained with a buried waveguide makes it possible to limit the losses by diffusion by the surface. The practical burying of the guide is illustrated in FIG. 2. The glass plate 2 with a semi-elliptical guide 6 and optionally the mask 4 closes a tight Teflon cell 8, within which a vacuum is formed. The glass plate is then immersed in a molten salt bath 10 at a temperature of approximately 400° C. The electric field is obtained by using two electrodes 16, 18, one of which is directly immersed in the salt bath and the other is in contact with the upper surface of the glass substrate 2 by means of an aluminium contact 12. A potential difference of several hundred volts is applied between these two electrodes. The molten salt (e.g. $NaNo_3$) is conductive and a significant problem linked therewith is the risk of a short-circuit which can be brought about by a defect in the seal 14 between the Teflon cell and the glass plate 2.

In addition, the process is relatively complicated and is not suitable for industrial scale use or the mass production of components.

Another process has been proposed, which makes it possible to produce a circular guide by combining two semi-elliptical guides. This manner of proceeding eliminates the stage of burying the guide by electric field effect. However, it requires the use of an adhesive, which considerably modifies the intensity distribution of the field close to the guide outlet. The adhesive film has an optical index which, even if it was very close to that of the guide, which is never the case, would considerably disturb the index profile of the guiding structure. Moreover, even a very high external pressure would not be sufficient to eliminate the presence of a slight air film, which disturbs the intensity distribution of the near field in the same way as an adhesive film. Finally, it is impossible to envisage this method in the case of a monomode waveguide at 1.3 or 1.5 µm. Thus, in this case, the diameter of the guide core is equal to a few microns and this process then comes up against two prohibitive problems:

- the size of the guides imposes an assembly technology which makes it possible to solve the alignment problem with respect to the two structures (the alignment must be approximately 1 micron),
- the presence of a film of adhesive and/or an air film at the interface, considerably disturbs the propagation, in view of the very small size of the guides (there is a very significant disturbance for a guide having a core with a diameter of 50 µm).

DESCRIPTION OF THE INVENTION

The present invention aims at solving these problems and proposes for this purpose a process for the preparation of a waveguide buried in a glass substrate and which involves the following stages:

- a stage of producing a waveguide by ion exchange, on the surface of each of the two glass substrates,
- a stage of aligning the two substrates, in such a way that the surfaces in which the waveguides were produced in the preceding stage face one another and
- a stage of direct wafer bonding of the two substrates.

This process for the production of waveguides in glass offers the following advantages. It eliminates the stage of burying the waveguides by applying an electric field. Thus, as explained hereinbefore, this is difficult to carry out on an industrial scale and leads to implementation and reproducibility problems, whereas the process of the invention can easily be industrialized. It permits the production in parallel and on the same substrate of several optical components, which considerably reduces manufacturing costs. It permits the production of both multimode and monomode components. There is no adhesive interface, so that this process does not modify the optical characteristics of the guides. It is possible to produce numerous components such as optical connectors or mirrors, which are buried and well centred with respect to the guide obtained by the process according to the invention. It makes it possible to control the desired guide burying depth.

The invention also relates to a process for producing an assembly incorporating a mirror and an optical guide buried in a glass substrate and comprising the following stages:

a stage of producing a waveguide by ion exchange, on the surface of each of the two glass substrates, a stage of producing a half-cavity at the end of each guide, a stage of depositing silver on the faces of each half-cavity and a stage of joining the two substrates by direct wafer bonding.

The invention also relates to a process for producing a connection device for an optical fibre having the following stages:

a stage of producing a waveguide by ion exchange, on the surface of each of two glass substrates, a stage of producing a half-cavity at the end of each guide, each half-cavity having a width substantially equal to the core of the fibre to be introduced and a height substantially equal to half the core of the same fibre and a stage of joining the two substrates by direct wafer bonding.

Embodiments of the invention can be gathered from the dependent claims.

BRIEF DESCRIPTION OF THE DRAWINGS

The invention is described in greater detail hereinafter relative to non-limitative embodiments and with reference to the attached drawings, wherein show.

DETAILED DESCRIPTION OF EMBODIMENTS

Figure 1A:
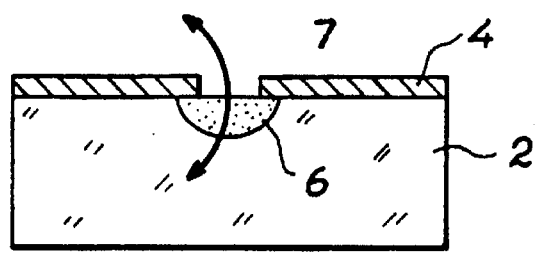
FIGS. 1a and 1b, already described, the stages of a process for producing a buried waveguide in a glass substrate according to the prior art.
Figure 1B:
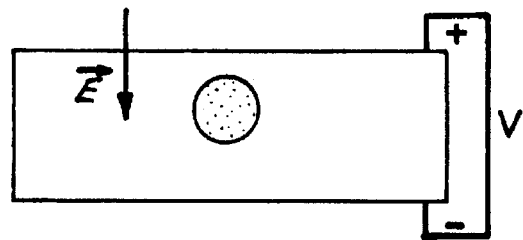
Figure 2:
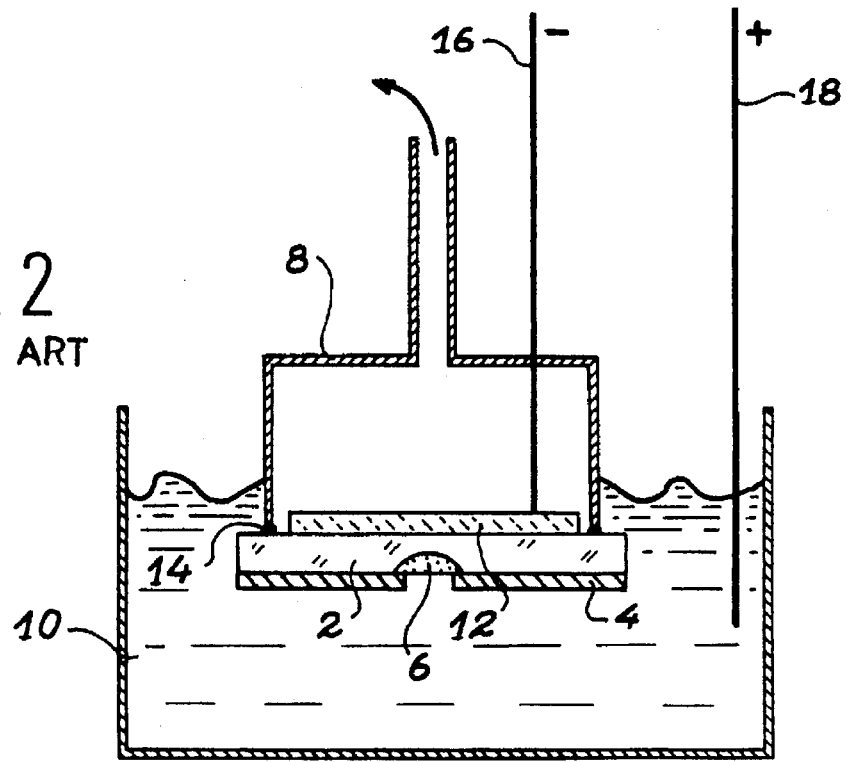
FIG. 2, already described, an experimental, prior art device used for burying the guides.
Figure 3A:
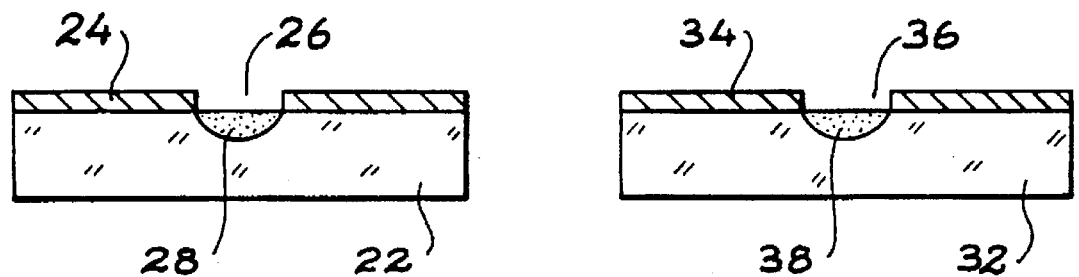
FIGS. 3a to 3c the essential stages of a process according to the invention.
Figure 3B:
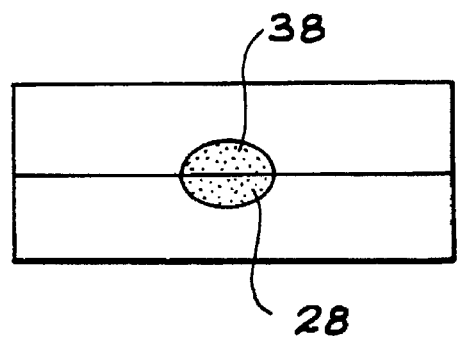
Figure 3C:
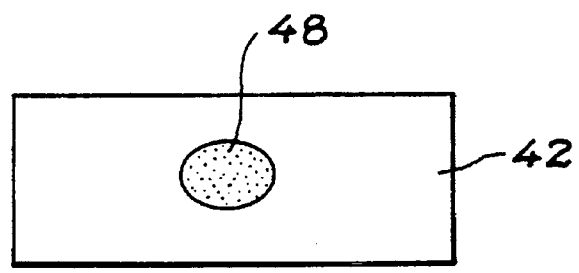

FIGS. 3a to 3c illustrate the stages of a process according to the invention used for producing a waveguide buried in a glass substrate. On the surface of two glass substrates 22, 32, preferably of microelectronics quality, are placed two aluminium masks 24, 34, having respectively windows 26, 36. The term microelectronics quality substrate is understood to mean substrates having a non-rough surface state (below a few nanometers) and which are flat. Using a standard ion exchange procedure, like that described in the introduction to the present application, two waveguides 28, 38 are produced on the surface of the glass substrate 22, 32. The width of said guides is defined by the width of the windows 26, 36, which are advantageously identical and made in aluminium masks, and the ion exchange can take place at the same time for both structures.

After removing the aluminium masks, the two substrates 22, 32 are aligned, in the manner illustrated in FIG. 3b, in such a way that the surfaces in which have been produced the waveguides 28, 38 face one another. This is followed by direct wafer bonding, which consists of joining the two solids, simply by contacting the said solids. The bonding is based on the establishment of adhesion forces between the entire facing surfaces, said forces intervening for distances between the two surfaces which are below a few dozen Angstroms. The forces are Waals forces, electrostatic forces and chemical interactions. The system constituted by the two contacting substrates stops evolving when all the attraction forces are in equilibrium with the repulsion forces between the electron clouds of the two surfaces (Born repulsion). The two substrates are then "prefused".

The quality of this prefusing is inter alia dependent on:

the particular contamination of the surfaces, the contacting operation preferably being carried out in a clean room of class 100 or 10;

the hydrophilicity of the two surfaces: the presence of OH groups at a rate of 4 to 6 per $nm^2$ permits the absorption of water molecules, said OH groups favouring the obtaining of a good quality prefusion, an adequate cleaning of the substrate e.g. in an acid chemical bath can be carried out in order to make the surfaces hydrophilic;

the planeity of the surfaces: it is preferable to choose surfaces sufficiently close to one another;

the roughness of the surfaces, which is preferably below a few nanometers (e.g. 1 nm).

The direct wafer bonding advantageously comprises a heat treatment consisting of an annealing under a controlled atmosphere, at a temperature below that at which the exchange was performed. Generally said annealing takes place at between 200° and 600° C. under a nitrogen or oxygen atmosphere. The need to choose an annealing temperature below the temperature at which the ion exchange was performed is linked with the fact that if this is not done the ions which were implanted in the glass by the ion exchange stage will diffuse into the glass substrate throughout the annealing operation. All the optical properties of the guide will then be greatly modified and in particular the index profile and dimensions of the guide. This annealing makes it possible to increase the mechanical strength of the thus obtained structure.

Following this heat treatment stage, a structure is obtained like that illustrated in FIG. 3c, where the reference 42 represents the glass substrate by joining the two substrates 22, 32 and where the guide 48 represents the guide obtained after joining the two guides 38, 28. It is important to note that with such a procedure, the bonding interface between the two substrates and the two guides 28, 38 is invisible, the two materials only forming a single structure. If it is wished to break the bonds between the two surfaces, when said process involves a heat treatment, it is necessary to apply a tensile force of several hundred kgf and the fracture instead of occurring at the bonding interface is distributed throughout the material. Thus, the adhesion obtained is very high.

In certain cases, once the ion exchange has taken place and the metal masks have been removed, a thinning down and/or polishing stage for the two surfaces of the substrate 22, 32 is necessary before contacting them with one another.

Figure 4A:
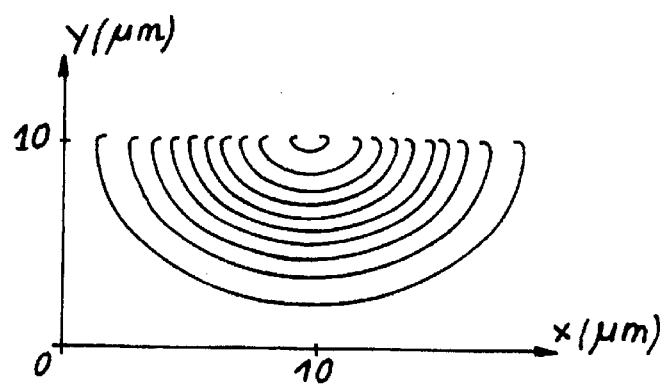
FIGS. 4a to 4c geometrical distributions of the index profile of an optical guide obtained by the process according to the invention.
Figure 4B:
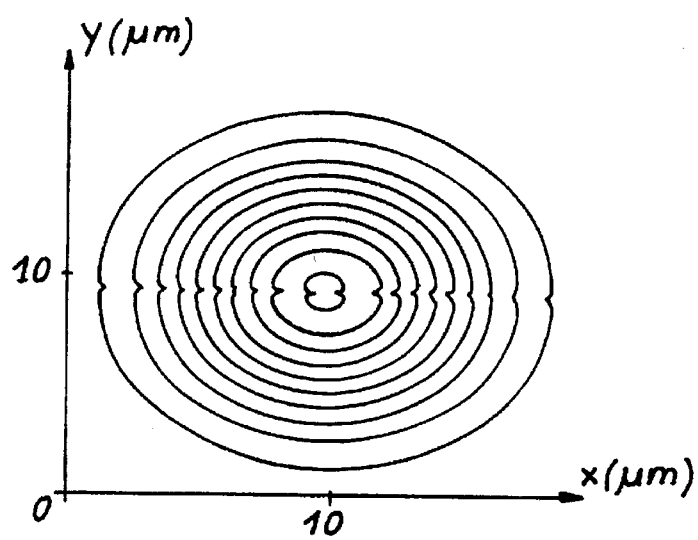

The main reason for thinning down or etching the substrates is to check the geometry of the index profile, so as to obtain guides which are as circular as possible. Thus, in certain cases, the circularity of the guides can be an important parameter, because it permits a good coupling coefficient with optical fibres. However, sometimes, the ion exchange stage leads to a geometrical distribution of the index profile like that shown in FIG. 4a. In the latter, it is easily possible to see irregularities in the zone close to the upper interface, i.e. the surface through which the ion exchange has taken place. If direct wafer bonding was then carried out without taking the necessary step of removing these irregularities, the geometrical distribution of the index profile of the guide obtained would have the configuration shown in FIG. 4b. In addition, the smaller the dimensions the more deformed the guide, which is the case with monomode guides.

Figure 4C:
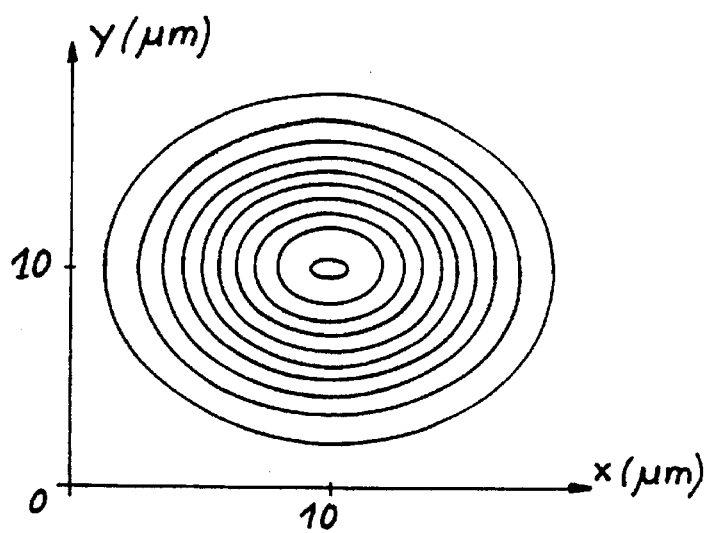

The best way to eliminate these irregularities is to remove material before carrying out the bonding of the two substrates. If the substrates are etched over an adequate thickness, the irregularity zone will be eliminated and, after direct wafer bonding, the guide obtained will be completely circular, even for small dimensions. The geometrical distribution of the index profile obtained is then close to that shown in FIG. 4c. The thickness to be removed at the surface of the substrate can be a few tenths of a micrometer.

Following this thickness reduction or etching stage, it is possible to polish the two plates with a view to obtaining surface states permitting direct wafer bonding.

Figure 5A:
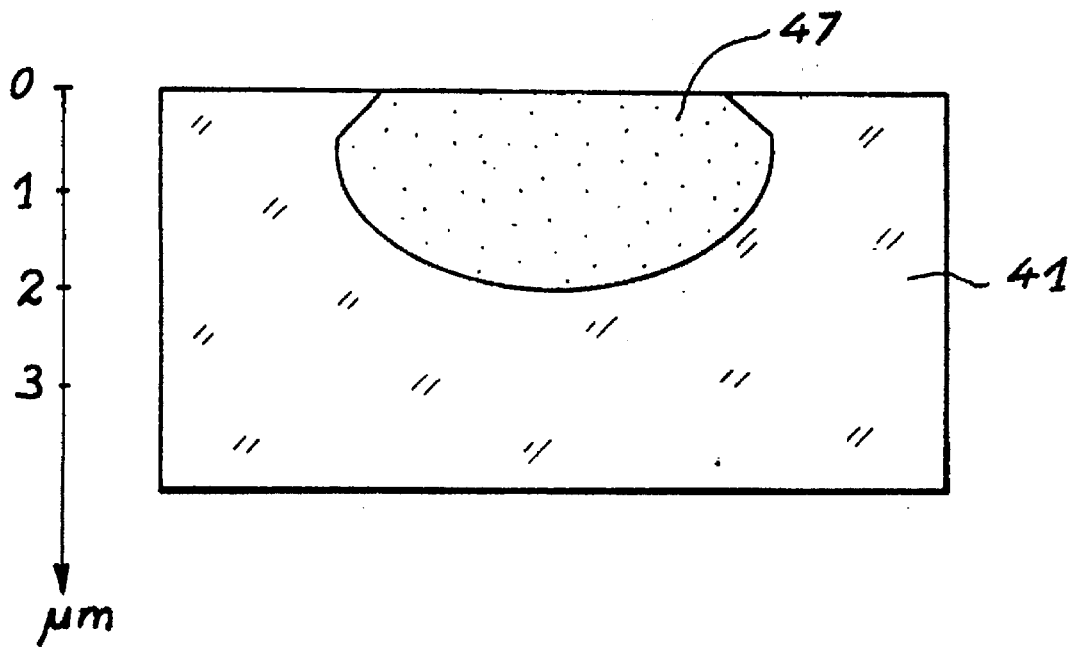
FIGS. 5a and 5b other stages according to particular modes of the performance of the invention.
Figure 5B:
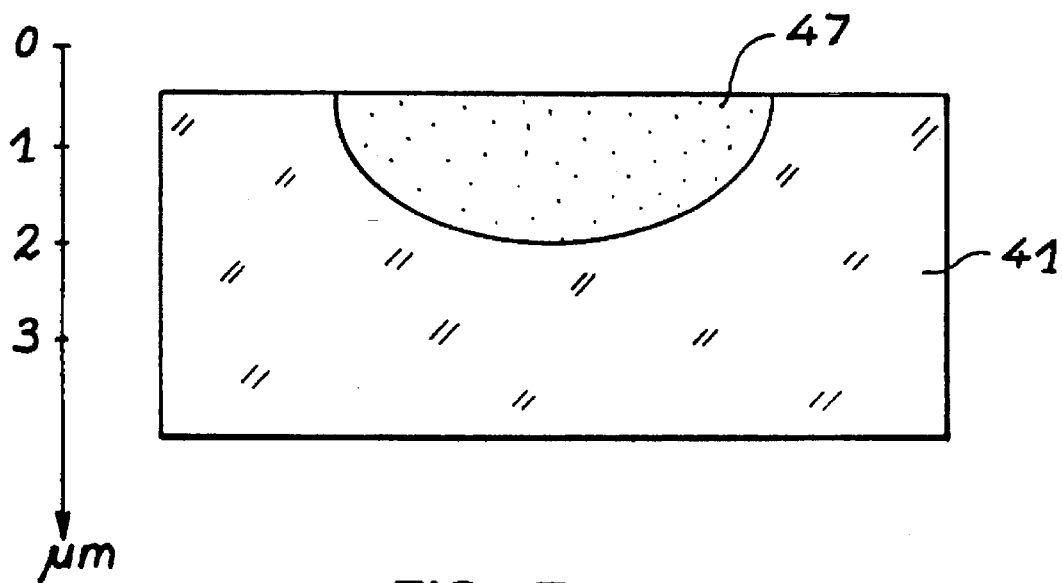

FIGS. 5a and 5b are a sectional view of the waveguide 47 (index $n_1$) obtained in a glass substrate 41 (index $n_2$), following the ion exchange stage before etching (FIG. 5a) and after etching (FIG. 5b). It can be seen that in order to obtain an approximately semicircular guide, it is necessary to remove a thickness of approximately 0.5 μm. For example, plasma etching (type RIE) is performed at a low pressure below 0.05 millibar. The gas used is $CHF_3$ and the time necessary for etching a thickness of 0.5 μm is about 10 minutes. In order to obtain a good surface state so as to produce direct melting under good conditions, it is then possible to carry out a mecanochemical polishing for approximately 10 minutes using Syton and a very soft felt. The thickness reduction can also take place by chemical or mechanical etching.

Optionally, before contacting the substrates with one another, they can be made hydrophilic by an adequate chemical treatment. An example of such a treatment consists of immersing the substrates for 10 minutes in a mixture of $H_2SO_4$ and $H_2O_2$ at 140° C., rinsing the plates with water and drying them correctly. This stage will be carried out in a clean room, because it will generally be immediately followed by the contacting of the substrates and the annealing process.

Figure 6A:
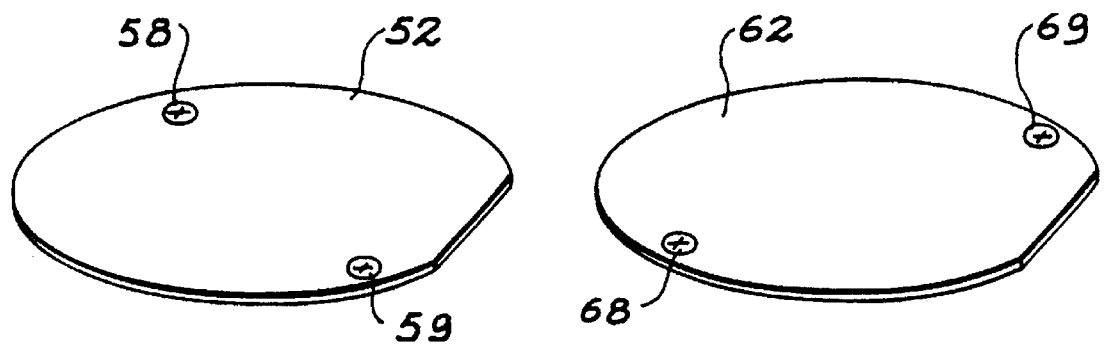
FIGS. 6a to 6c stages of marking and producing guides within the framework of a collective performance of the invention.
Figure 6B:
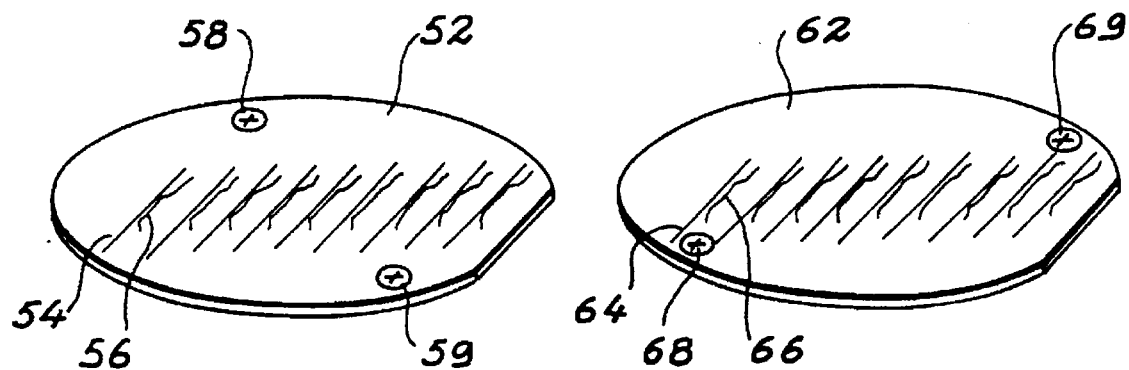
Figure 6C:
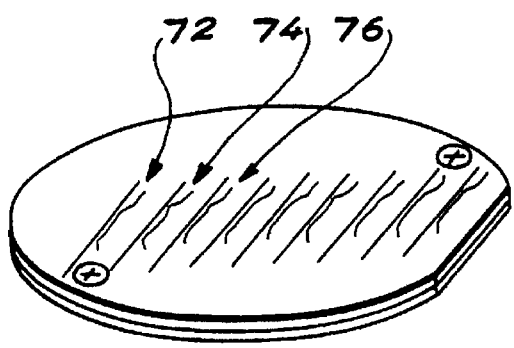

FIGS. 6a to 6c represent the stages of the collective performance of the process described hereinbefore, e.g. for the manufacture of optical couplers. For each coupler and using a mask having adequate windows, two guides 54, 56 and 64, 66 are produced in each of the two substrates 52, 62 (FIG. 6b). The two substrates are then contacted with one another, followed by the above-described bonding stage. This gives a series of couplers, like those referenced 72, 74, 76 in FIG. 6c. It is then possible to cut up the substrate in order to form individual couplers.

The reciprocal positioning of the two substrates 52, 62 can be problematical. Thus, the quality of the optical components produced is dependent on the good positioning of the facing semicircular guides. The positioning tolerance is approximately 1 um when producing monomode guides. This tolerance can be much greater when producing multimode components. Thus, from the outset, it is possible to produce on the surfaces of the substrates 52, 62 positioning patterns 58, 59, 68, 69. These patterns make it possible to position the masks with respect to the substrate and the substrates with respect to one another. Without these patterns, the positioning of the two substrates can be difficult, because they are completely transparent and the ion exchange does not adequately modify the index of the glass to enable the guides to be visible so as to permit positioning.

Figure 7A:
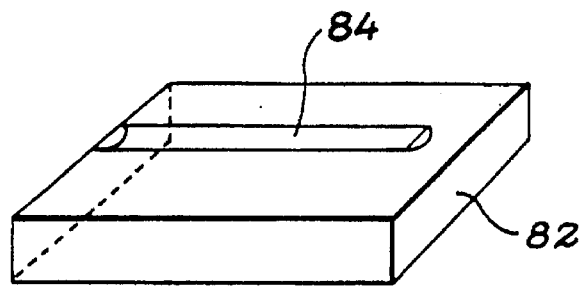
FIGS. 7a to 7c stages in producing a mirror associated with a guide obtained by a process according to the invention.
Figure 7B:
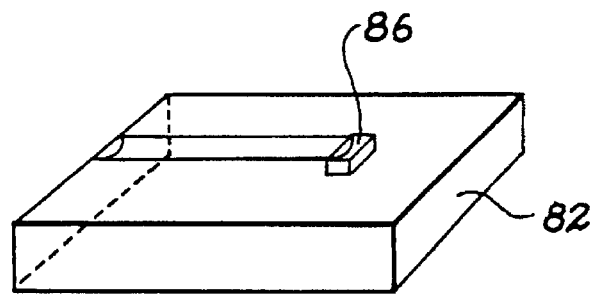
Figure 7C:
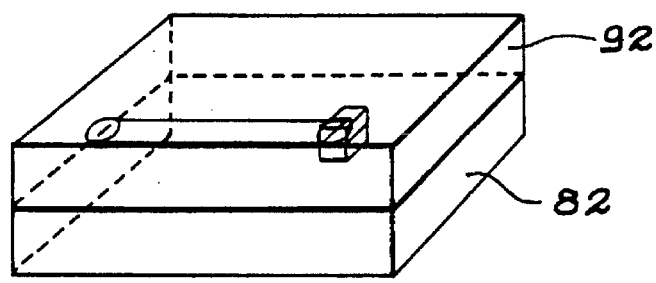

FIGS. 7a to 7c illustrate the production of a mirror. Firstly and as illustrated in FIG. 7a, a guide 84 is produced by ion exchange in a substrate 82. Then, according to FIG. 7b, a half-cavity 86 is produced at the end of each guide, e.g. by RIE-type plasma etching at a low pressure below 0.05 millibar. The gas used is $CHF_3$ and the time necessary for etching a height of 2 μm is approximately 40 minutes.

This is followed by a deposition, e.g. of silver, on the faces of each half-cavity 86. It is then possible to prepare the surface of the substrate 82, by thinning down and polishing and then using direct wafer bonding the two substrates 82, 92 prepared in the same way are joined.

For an approximately 2 um etching of the half-cavity 86, the mirror at the end of the process will essentially have the same dimensions as the waveguide, which is then monomodal at the wavelengths used in the telecommunications field.

Figure 8A:
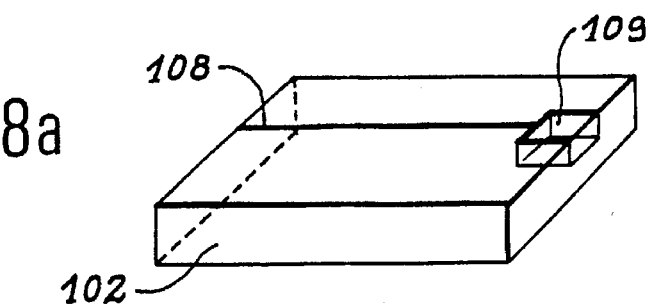
FIGS. 8a to 8d stages in connection with the production of an optical fibre connection using a process for producing a buried guide according to the invention.
Figure 8B:
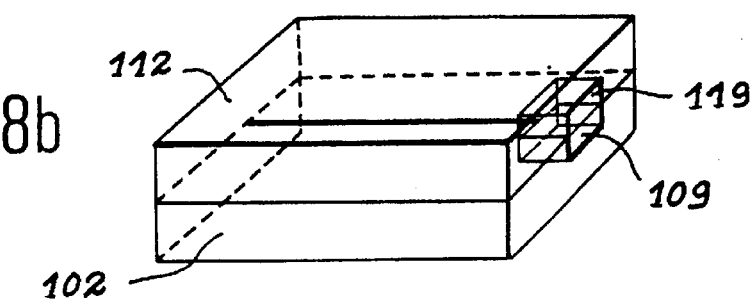
Figure 8C:
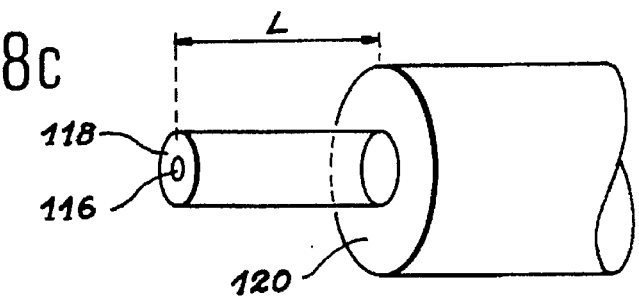
Figure 8D:
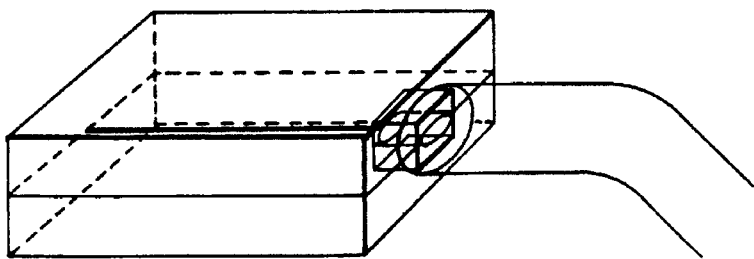

FIGS. 8a to 8d show stages in the production of a device permitting the connection to an optical fibre. In a substrate 102 (FIG. 8a), is produced a waveguide 108 by ion exchange, e.g. so as to obtain at the end of the process a 0.6 μm unimodal guide. This is followed by producing a cavity 109 at the end of the guide and centred with respect to the latter. Typically such a cavity will have a width of 125 μm, a height of 62 μm and a depth of e.g. 3 mm. For producing such a cavity chemical etching is preferred and e.g. the substrate 102 is immersed in an etching bath constituted by a mixture of HF and $NH_4F$ using a mask constituted by an Au—Cr alloy film obtained by vapour deposition. Then, using direct wafer bonding, two substrates 102, 112 (FIG. 8b) prepared in the same way are joined. The final cavity is constituted by the joining of two half-cavities 109 and 119. This is followed by the preparation (FIG. 8c) of an optical fibre (here a unimodal optical fibre of 0.6 μm), whose optical core 116 has the same dimensions as the buried guide in the glass. The optical or fibre cladding 118 of such a fibre has a diameter of approximately 125 um and is protected by a polymer covering 120, which is eliminated over a length L corresponding to the cavity depth and in this case approximately 3 mm. The introduction of the end of the cladding into the cavity makes it possible to bring about the connection to the optical fibre (FIG. 8d). The interest of such a structure is the autopositioning of the fibre (both vertically and horizontally) with respect to the buried optical guide.

The numerical details given hereinbefore with respect to the dimensions of the cavity are in no way limitative. It is sufficient for said dimensions to permit the introduction and maintaining of the fibre in autopositioned manner with respect to the buried optical guide. It is e.g. sufficient for the cavity to have a width and a height substantially equal to the diameter of the fibre core.

The industrial applications of the present invention are those of general integrated optics. Thus, as a result of this process, it is possible to envisage the collective production of a plurality of components, such as passive components for telecommunications, sensors such as interferrometric or polarimetric sensors, etc.

We claim:

1. Process for the preparation of a waveguide buried in a glass substrate, formed of first and second glass substrates, and comprising the following stages:

a stage of producing a waveguide by ion exchange on a surface of each of said first and second glass substrates, a stage of aligning said first and second substrates in such a way that said surfaces on which said waveguides have been produced face one another, and a stage of direct wafer bonding of said first and second substrates.

2. Process according to claim 1, said direct wafer bonding stage comprising a heat treatment consisting of an annealing under a controlled atmosphere.

3. Process for the preparation of a waveguide according to either of the claims 1 and 2, said first and second substrates being of microelectronics quality glass.

4. Process for the preparation of a waveguide according to either of the claims 1 and 2, said respective surfaces of said first and second substrates on which said waveguides are produced by ion exchange have a roughness below a few nm.

5. Process for the preparation of a waveguide according to claim 1, comprising, after the ion exchange stage, a stage of thinning down the surface of each of said two substrates on which waveguides are produced by ion exchange.

6. Process according to claim 5, wherein said thinning down stage is performed by plasma etching or by chemical or mechanical etching.

7. Process according to claim 1 comprising prior to said alignment stage, a polishing stage.

8. Process according to claim 7, said polishing stage being a mechano-chemical stage.

9. Process according to claim 1, also comprising a chemical treatment stage in order to make said surfaces of each of said first and second substrates hydrophilic prior to said alignment stage.

10. Process for the production of an assembly having a mirror and an optical guide buried in a glass substrate, comprising the following stages:

a stage of producing a waveguide by ion exchange on a surface of each of first and second glass substrates, a stage of producing a half-cavity at the end of each of said waveguides, a stage of depositing silver on faces of each of said half-cavity and a stage of joining said first and second substrates by direct wafer bonding.

11. Process according to claim 10, said half-cavity at the end of each of said waveguides being produced by low pressure plasma etching.

12. Process for producing a connection device for an optical fibre comprising the following stages:

a stage of producing a waveguide by ion exchange on the surface of each of first and second glass substrates, a stage of producing a half-cavity at the end of each of said waveguides, each half-cavity having a width substantially equal to a core of said optical fibre which is to be introduced and a height substantially equal to half said core of said optical fibre, a stage of joining said first and second substrates by direct wafer bonding.

13. Process according to claim 12, each half-cavity being produced by chemical etching.

* * * * *

UNITED STATES PATENT AND TRADEMARK OFFICE
CERTIFICATE OF CORRECTION

PATENT NO. : 5,656,181            Page 1 of 2

DATED : August 12, 1997

INVENTOR(S) : Biasse et al.

It is certified that error appears in the above-indentified patent and that said Letters Patent is hereby corrected as shown below:

On the title page, in section [75] Inventors:, the city of the second inventor should be --Saint Etienne--.

in section [56] Reference Cited, the following should be inserted:

--U.S. Patent Documents 5,135,605     8/1992       Blonder et al.

Foreign Patent Documents 0,052,901     6/1982      Europe
0,359,166     3/1990      Europe
0,318,267     5/1989      Europe Other Prior Art Artech House, London, 1992 - "INTRODUCTION TO GLASS INTEGRATED OPTICS", S. Najafi.

PATENT ABSTRACTS OF JAPAN - Vol. 007, No. 231, (P-229), October 13, 1983 & JP-58 118607 (Nippon Denki KK) July 14, 1983.

PATENT ABSTRACTS OF JAPAN - Vol. 007, No. 249, (P-234), November 5, 1983 & JP-58 134609 (Nippon Denki KK) August 10, 1983.

UNITED STATES PATENT AND TRADEMARK OFFICE
CERTIFICATE OF CORRECTION

PATENT NO. : 5,656,181

DATED : August 12, 1997

INVENTOR(S) : Biasse et al.

It is certified that error appears in the above-indentified patent and that said Letters Patent is hereby corrected as shown below:

JOURNAL OF APPLIED PHYSICS, Vol. 61, No. 1, January 1, 1987, New York, Pgs. 52-56, "ION EXCHANGE PROCESS FOR FABRICATION OF WAVEGUIDE COUPLERS FOR FIBER OPTIC SENSOR APPLICATIONS", Honkanen et al.--.

Column 1, line 47, delete "aluminlum" and insert -- aluminium--.

Signed and Sealed this

Third Day of February, 1998

Attest:

BRUCE LEHMAN

Attesting Officer

Commissioner of Patents and Trademarks